US012699406B2

(12) United States Patent
Stein

(10) Patent No.: US 12,699,406 B2
(45) Date of Patent: Aug. 4, 2026

(54) METHOD OF CARRYING OUT A DEPARTURE INSPECTION ON AN AUTONOMOUS VEHICLE COMBINATION

(71) Applicant: Daimler Truck AG, Leinfelden-Echterdingen (DE)

(72) Inventor: Fridtjof Stein, Ostfildern (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 62 days.

(21) Appl. No.: 18/744,641

(22) Filed: Jun. 16, 2024

(65) Prior Publication Data

US 2024/0419191 A1      Dec. 19, 2024

(51) Int. Cl.
G05D 1/689 (2024.01)
G05D 1/221 (2024.01)
G07C 5/00 (2006.01)
G05D 105/80 (2024.01)

(52) U.S. Cl.
CPC ............. G05D 1/689 (2024.01); G05D 1/221 (2024.01); G07C 5/008 (2013.01); G05D 2105/89 (2024.01)

(58) Field of Classification Search
None
See application file for complete search history.

(56) References Cited

U.S. PATENT DOCUMENTS

| | | | | |
|---|---|---|---|---|
| 7,896,113 B1 * | 3/2011 | Ramirez | .............. | G05D 1/0038 |
| | | | | 180/9 |
| 2008/0179115 A1 * | 7/2008 | Ohm | .................... | B62D 55/075 |
| | | | | 901/1 |
| 2019/0030720 A1 * | 1/2019 | Herold | .................... | B25J 9/1661 |
| 2023/0195106 A1 * | 6/2023 | Siegler | ................. | G06Q 10/047 |
| | | | | 701/2 |
| 2024/0259665 A1 * | 8/2024 | Ravuri | .................... | H04N 23/57 |

FOREIGN PATENT DOCUMENTS

| | | |
|---|---|---|
| DE | 112016007265 T5 | 6/2019 |
| DE | 102019133172 A1 | 6/2021 |
| DE | 102021116068 A1 | 12/2022 |

* cited by examiner

*Primary Examiner* — Hongye Liang
(74) *Attorney, Agent, or Firm* — Dennemeyer & Associates LLC

(57) ABSTRACT

The invention relates to a method of carrying out a departure inspection on an autonomous vehicle combination. In a method that shortens the inspection period, before departure of the vehicle combination (1), a first region (15) under the towing vehicle (3) of the vehicle combination (1) is checked for living beings and objects by means of a sensor system (13) fixedly installed on the towing vehicle (3), and a second region (21) under the trailer (5) of the vehicle combination (1) is checked by means of a mobile robot (19) comprising a further sensor system (15).

7 Claims, 5 Drawing Sheets

Figure 1:
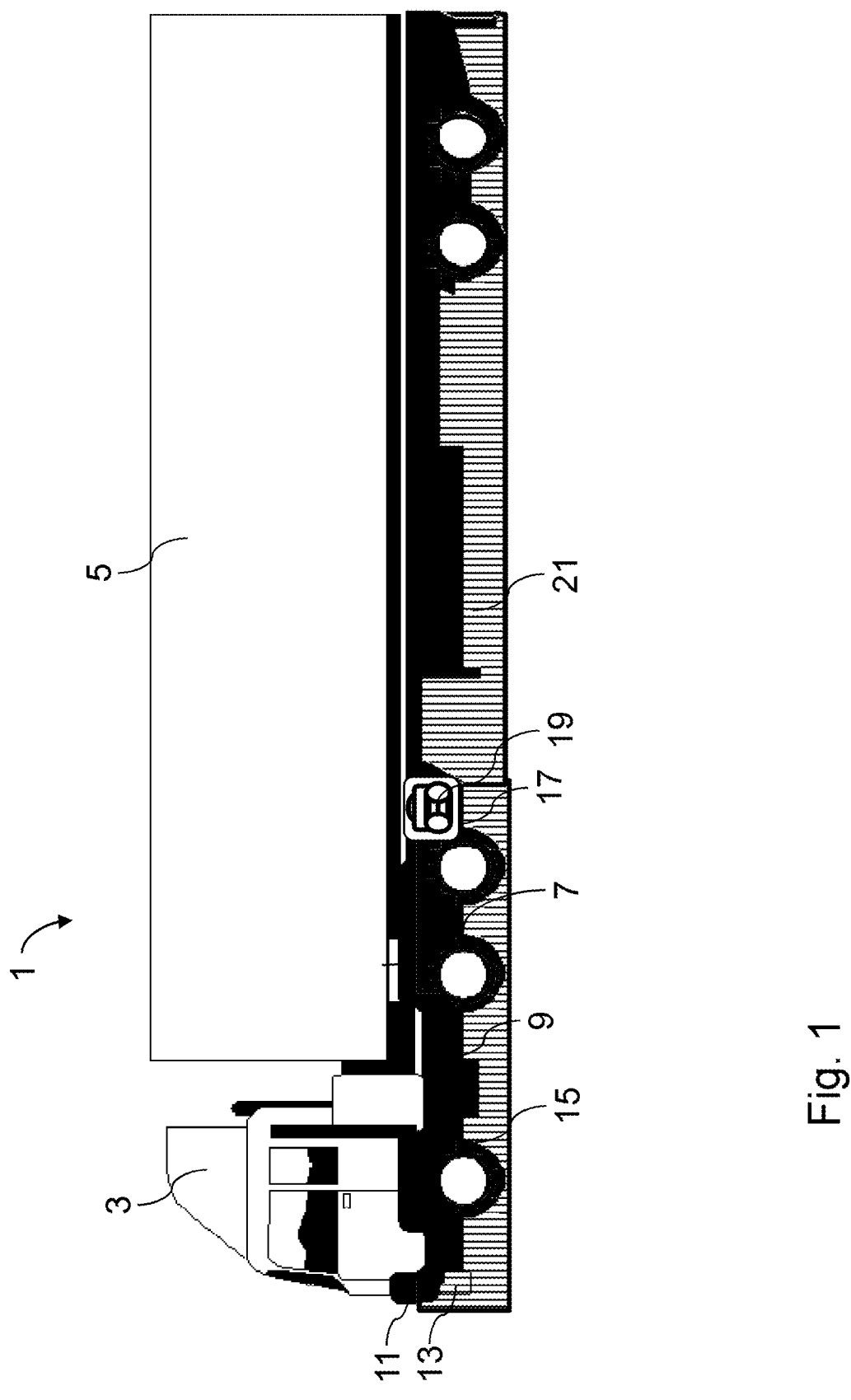

METHOD OF CARRYING OUT A DEPARTURE INSPECTION ON AN AUTONOMOUS VEHICLE COMBINATION

CROSS-REFERENCE TO RELATED APPLICATIONS

This is a Paris Convention Patent Application which claims priority to German patent application 10 2023 115 823.6, filed Jun. 16, 2023, of which is hereby incorporated by reference in its entirety.

The invention relates to a method of carrying out a departure inspection on an autonomous vehicle combination.

A method of checking a state of a component of the vehicle is known from DE 10 2019 133 172 A1. A mobile recording device records a defined region under the vehicle and transmits the recorded data to an evaluation device. The mobile recording device is transported by the vehicle. The evaluation device determines the state of the vehicle component using the recorded data. When an error is determined in the component, the vehicle is guided to a repair garage.

DE 11 2016 007 265 T5 discloses a method of using an unmanned aerial vehicle to check autonomous vehicles. The exteriors of the vehicles are inspected by means of the unmanned aerial vehicle. To inspect an underside of the vehicle, the unmanned aerial vehicle is landed and the vehicle drives over the top of said unmanned aerial vehicle.

A method of inspecting a vehicle by means of an inspection vehicle is shown in DE 10 2021 116 068 A1. It is checked whether a vehicle intends to depart at a site. If this is the case, the inspection vehicle moves to the departing vehicle and records the region under the vehicle with a sensor to check it for living beings or objects that can hinder the departure of the vehicle.

The object of the invention is to specify a method of carrying out a departure inspection on an autonomous vehicle combination, which shortens the inspection period.

The invention results from the features of the independent claims. Advantageous developments and embodiments are the subject matter of the dependent claims. Further features, applications and advantages of the invention result from the following description and the explanation of exemplary embodiments of the invention that are depicted in the figures.

The object is solved with the subject matter of claim 1.

In the method explained in the introduction of carrying out a departure inspection on an autonomous vehicle combination, before departure of the vehicle combination, a first region under the towing vehicle of the vehicle combination is checked for living beings and objects by means of a sensor system fixedly installed on the towing vehicle, and a second region under the trailer of the vehicle combination is checked by means of a mobile robot comprising a further sensor system. By dividing the space to be investigated under the vehicle combination into two regions, said regions can be checked simultaneously, which leads to a reduction in inspection time. The space under the towing vehicle can be scanned without interruption by the first sensor system formed on the towing vehicle. The mobile robot that inspects the second region under the trailer ensures that portions which are otherwise in shadow are also reliably checked for objects and living beings before the departure of the vehicle combination. Dangerous situations are prevented by the complete departure check. Inspection costs are reduced by dispensing with a plurality of sensors fixedly installed on the trailer.

Advantageously, the mobile robot is transported in the vehicle combination. It is thus guaranteed that the space under the vehicle combination can be checked before its departure not only at a depot, but also after taking a break, etc., because the mobile robot is available at any time.

In one embodiment, the mobile robot is transported in a storage box on the base of the vehicle combination while the vehicle combination is travelling. The robot is thus protected from dirt during the journey, and is thus ready for use at any time.

In one variant, the mobile robot communicates wirelessly with the vehicle combination during the entire departure inspection under the trailer. The freedom of movement of the robot is increased by the wireless data transmission, wherein the continuous transmission of the recorded data makes it possible to continuously evaluate the entire space under the vehicle combination.

In one embodiment, the mobile robot is charged in the storage box when not in use. It is thus guaranteed that the mobile robot is ready for use at any time.

In a further embodiment, the mobile robot communicates with the vehicle combination via a wired connection during the entire departure inspection under the trailer. It is thus not required to install charging units in the storage box.

It is advantageous if the data determined by the first sensor system of the towing vehicle and the data determined by the further sensor system of the trailer are evaluated in the vehicle combination or a vehicle backend. This enables the evaluation electronics to be installed variably. In particular, when evaluating the data in a vehicle backend, computing times in the vehicle combination are reduced.

Further advantages, features and details result from the following description, in which—where appropriate with reference to the drawing—at least one exemplary embodiment is described in detail. Features described and/or visually represented can form the subject matter of the invention per se or in any logical combination, optionally also independent of the claims, and in addition can in particular also be the subject matter of one or more separate application(s). Identical, similar and/or functionally identical parts are provided with the same reference numerals.

Figure 2:
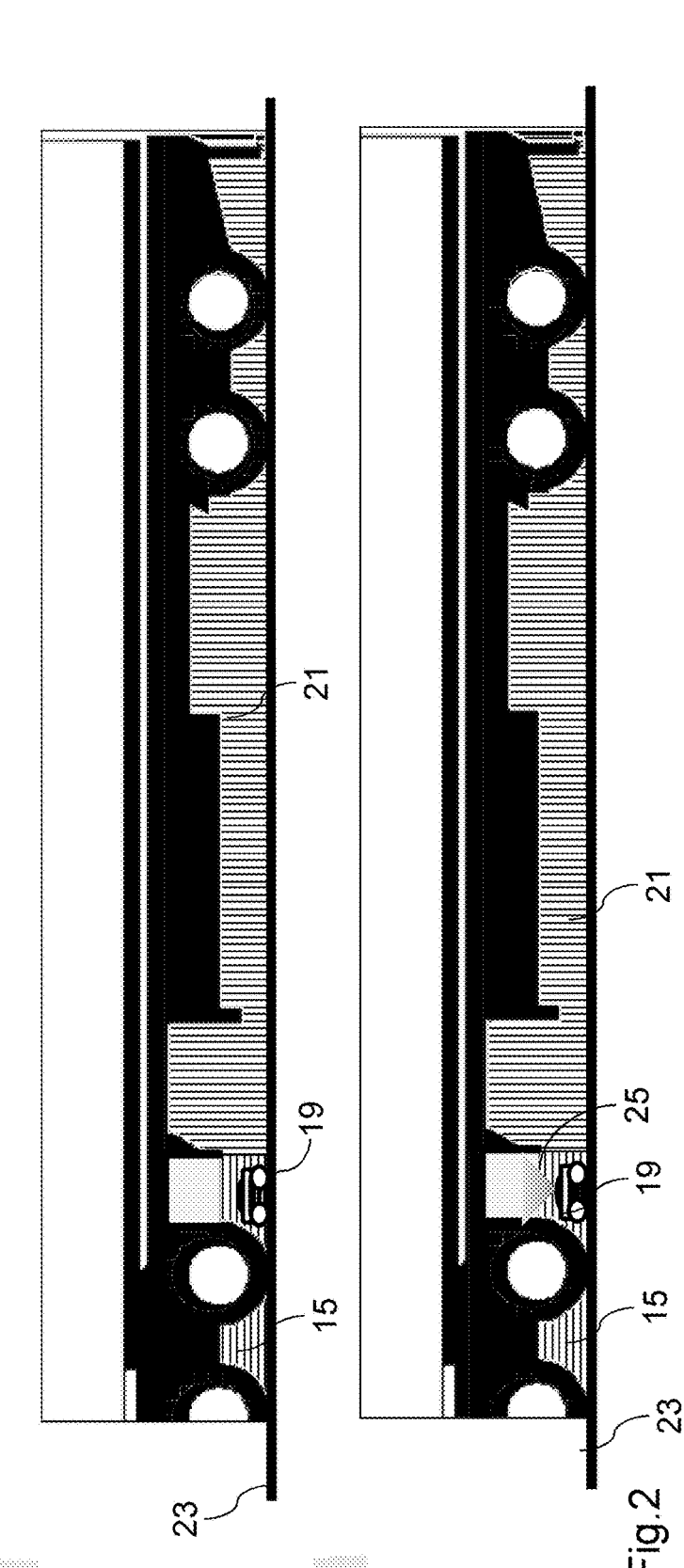
Figure 2:
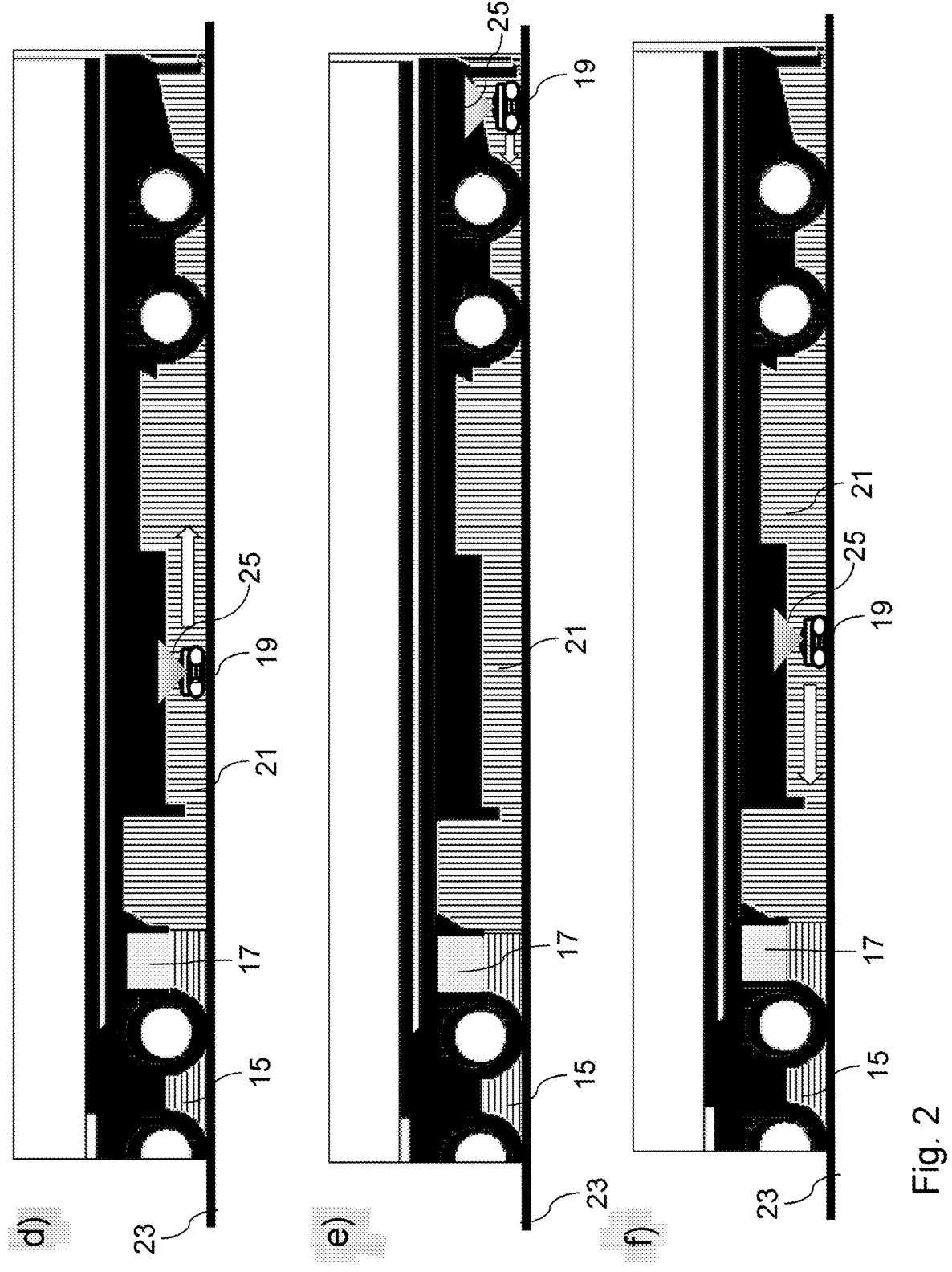
Figure 2:
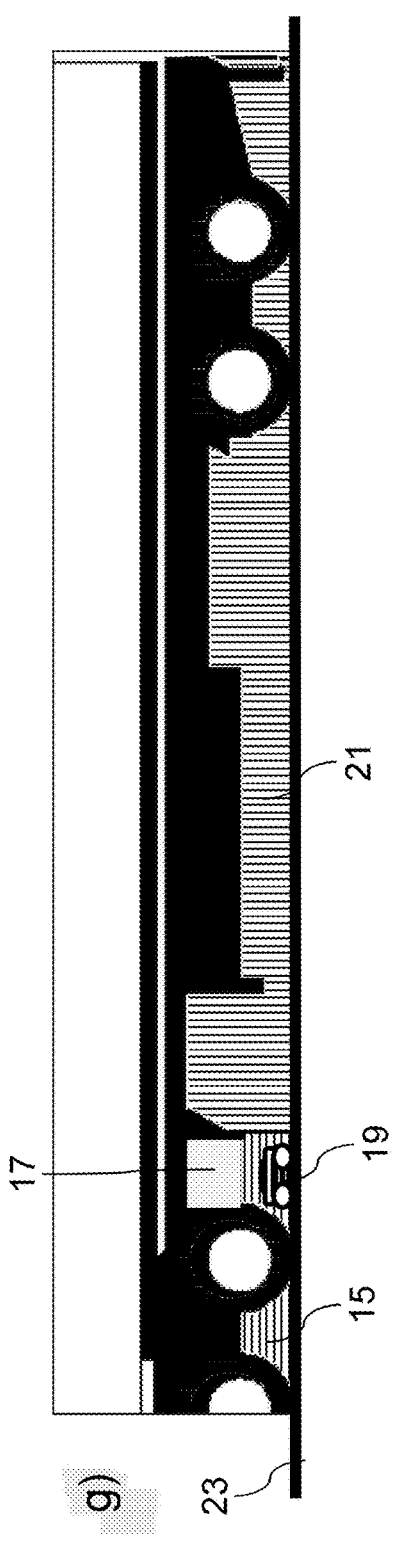
Figure 2:
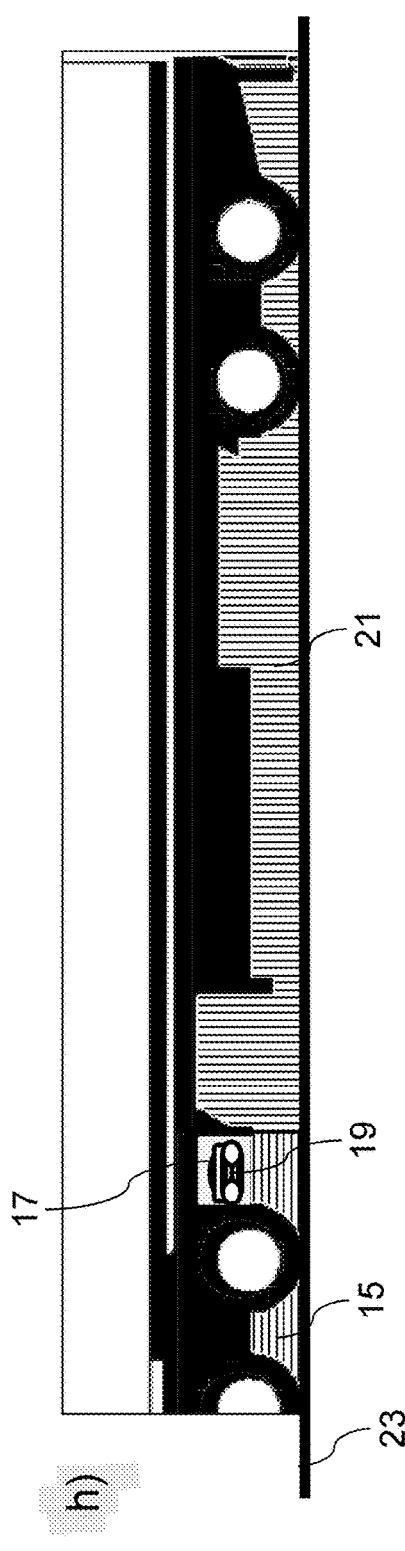
Figure 3:
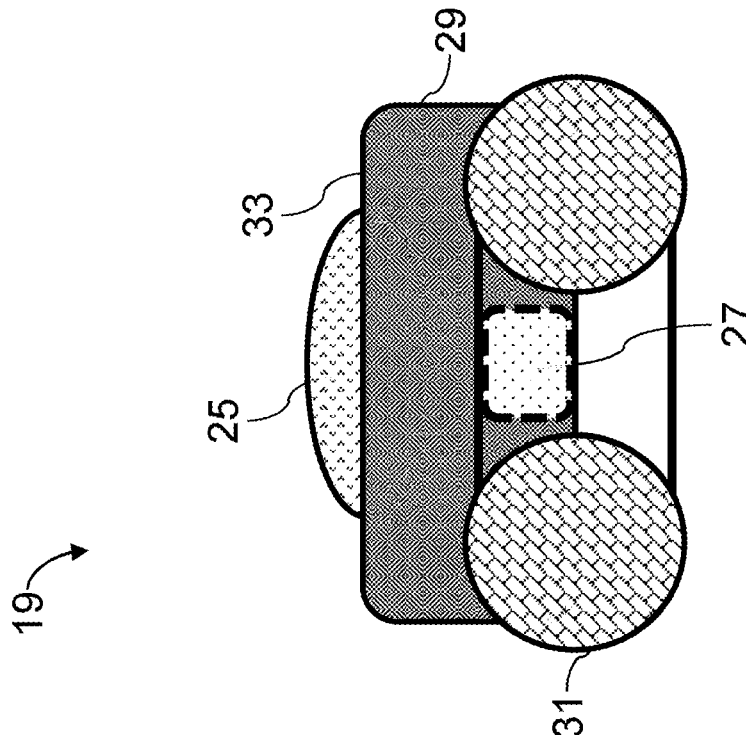

In the drawing:

FIG. 1 shows an exemplary embodiment of a vehicle combination with a mobile robot, FIG. 2 shows an exemplary embodiment of the method according to the invention, FIG. 3 shows an exemplary embodiment of the mobile robot.

In FIG. 1, an exemplary embodiment of a vehicle combination with a mobile robot is depicted. The vehicle combination 1 is for example designed as a semi-trailer, which comprises a tractor unit 3 and a trailer 5, wherein the trailer 5 is coupled with the tractor unit 3 via a fifth-wheel coupling 7. A sensor system 13 is fixedly positioned under the bumper 11 of the towing vehicle 3, said sensor system monitoring a first region 15 under the tractor unit 3 for living beings and objects during a departure inspection of the vehicle combination 1. A storage box 17 for transporting a mobile robot 19 is formed in the rear region of the base 9 of the tractor unit 3. The mobile robot 19 is used to monitor a second region 21 under the trailer 5 during the departure inspection.

The departure inspection by means of the mobile robot 19 is explained with reference to FIG. 2. In FIG. 2a, the mobile robot 19 is located in its storage box 17 and is released from this storage box 17 onto the road 23 under the vehicle combination 1 for the departure check (FIG. 2b). After the robot 19 is set down on the road 23, a sensor system 25 arranged on the robot 19 is activated (FIG. 2*c*), which is aligned in the direction of the trailer 5. A patrol is then carried out according to FIG. 2*d* by the robot 19 in the second region 21 under the trailer 5. Every hidden and/or non-visible portion under the trailer 5 is also accessed (FIG. 2*e*). When the departure inspection is complete, the mobile robot 19 drives back to its storage box 17 (FIG. 2*f*), where it positions itself under the storage box (FIG. 2*g*). In FIG. 2*h*, the robot 19 is stowed in the storage box 17 again and is charged in said storage box.

The mobile robot 19 can be connected to the vehicle combination 1 by wires during the departure inspection, or can be controlled via a wireless connection. The mobile robot 19 is in contact with a computer of the vehicle combination for the entire time. The sensor data recorded by the robot 19 is either automatically evaluated in the vehicle combination 1 or transmitted to a vehicle backend, which takes over the evaluation of the sensor data.

An exemplary embodiment of the mobile robot 19 is depicted in FIG. 3. The robot has a body 29 comprising an electric drive 27, to which body wheels 31 are fixed. The sensor system 25, for example a thermal camera, is fixed to the top side 33 of the body 29.

LIST OF REFERENCE NUMERALS 1 vehicle combination
3 tractor unit
5 trailer
7 fifth-wheel coupling
9 base of the tractor unit
11 bumper
13 sensor
15 first region under the tractor unit
17 storage box
19 mobile robot
21 second region under the trailer
23 road
25 sensor
27 electric drive
29 body of the robot
31 wheel
33 top side of the robot

The invention claimed is:

1. A method of carrying out a departure inspection on an autonomous vehicle combination (1), comprising a towing vehicle (3) and a trailer (5), characterised in that
   before departure of the autonomous vehicle combination (1);
      a first region (15) under the towing vehicle (3) of the autonomous vehicle combination (1) is checked for living beings and objects by means of a sensor system (13) fixedly installed on the towing vehicle (3), and a second region (21), under the trailer (5) of the autonomous vehicle combination (1), is inspected by means of a mobile robot (19) comprising a further sensor system (25), the method of inspection by mobile robot (19) includes the steps of:
   storing the mobile robot (19) in a storage box (17) carried by the autonomous vehicle;
   releasing the mobile robot (19) from the storage box (17) onto a surface under an end of the trailer (5) portion of the autonomous vehicle combination (1);
   activating a sensor system (25) on the mobile robot (19) such that the mobile robot (19) autonomously travels beneath the trailer (5), substantially inspecting the entire underside of the trailer (5), and;
   then storing the mobile robot (19) in the storage box (17) in a manner that the mobile robot (19) can be deployed again, as needed.

2. The method according to claim 1, characterised in that the mobile robot (19) is transported in the autonomous vehicle combination (1).

3. The method according to claim 2, characterised in that the mobile robot (9) is transported in a storage box (17) on a base (9) of the autonomous vehicle combination (1) while the autonomous vehicle combination (1) is travelling.

4. The method according to claim 3, characterised in that the mobile robot (19) is charged in a storage box (17) within the autonomous vehicle combination (1), when not in use.

5. The method according to claim 1, characterised in that the mobile robot (19) continuously communicates wirelessly with the autonomous vehicle combination (1) during the entire departure inspection under the trailer (5).

6. The method according to claim 1, characterised in that the mobile robot (19) continuously communicates with the autonomous vehicle combination (1) via a wired connection during the inspection under the trailer (5).

7. The method according to claim 1, characterised in that any data determined by the first sensor system (13) of the towing vehicle (3) and any data determined by the further sensor system (25) of the mobile robot (19) are evaluated in the autonomous vehicle combination (1) or in a vehicle backend.

\* \* \* \* \*